United States Patent [19]
Greene

[11] Patent Number: 5,327,133
[45] Date of Patent: Jul. 5, 1994

[54] DIGITAL INTEGRATOR WITH REDUCED CIRCUIT AREA AND ANALOG-TO-DIGITAL CONVERTER USING SAME

[75] Inventor: Richard L. Greene, Austin, Tex.

[73] Assignee: Motorola, Inc., Schaumburg, Ill.

[21] Appl. No.: 19,379

[22] Filed: Feb. 16, 1993

[51] Int. Cl.⁵ .............................................. H03M 1/50
[52] U.S. Cl. ..................................... 341/143; 341/166
[58] Field of Search ............... 341/143, 155, 166, 167, 341/168; 375/26, 27, 33

[56] References Cited

U.S. PATENT DOCUMENTS

| | | | |
|---|---|---|---|
| 4,736,242 | 4/1988 | Takanashi et al. | 358/44 |
| 4,972,356 | 11/1990 | Williams | 364/724.1 |
| 4,999,798 | 3/1991 | McCaslin | 364/724.1 |
| 5,084,702 | 1/1992 | Ribner | 341/143 |
| 5,103,229 | 4/1992 | Ribner | 341/143 |

Primary Examiner—Brian K. Young
Attorney, Agent, or Firm—Paul J. Polansky; James L. Clingan, Jr.

[57] ABSTRACT

A digital integrator (22) reduces circuit area and power consumption by implementing a two-stage integration for a decimator with only one adder (51). In the z-domain, he transfer function of a two-stage integrator can be expressed as $H(z)=(1/(1-z^{-1}))^2$. Expanded, the transfer function is expressed as $H(z)=(1/(1-2z^{-1}+z^{-2}))$. The inverse z-transform yields the expression $y[n]=x[n]+2y[n-1]-y[n-2]$, which can be implemented with a single adder (51) and two delay portions (52, 55 and 53, 54). In one embodiment, a three-stage integrator (22) can further be implemented within a single adder circuit (91) by time-multiplexing an addition required for the two-stage integration with an addition required for a one-stage integration inside the adder circuit (91).

23 Claims, 4 Drawing Sheets

DIGITAL INTEGRATOR WITH REDUCED CIRCUIT AREA AND ANALOG-TO-DIGITAL CONVERTER USING SAME

FIELD OF THE INVENTION

This invention relates generally to signal processors, and more particularly, to digital integrators.

BACKGROUND OF THE INVENTION

Sigma-delta data converters have enjoyed popularity because they rely on precise timing rather than precisely-matched components, and are thus easy to manufacture in integrated circuit form. The sigma-delta technique is commonly used for both analog-to-digital converters (ADCs) and digital-to-analog converters (DACs). A first-order sigma-delta modulator for an ADC subtracts a feedback signal from a received analog input signal to provide an error signal. The error signal is integrated, and the integrated error signal is input to a quantizer. The quantizer resolves the integrated error signal into one of a finite number of states to provide the output of the sigma-delta modulator portion of the ADC. This modulator output is provided to an input of a feedback DAC, the output of which provides the feedback signal. The digital output of the quantizer has a density proportional to the analog level of the signal. However, a decimator is required to construct the digital output code from the output and to attenuate the quantization noise that the sigma-delta modulator enhances in the stopband.

One-bit quantizers are commonly used, making the output of the sigma-delta modulator a single-bit stream. However, multi-bit quantizers are sometimes used. A second-order sigma-delta modulator is also commonly used in place of the first-order modulator. The second-order modulator differs from the first-order modulator by including two integration and feedback correction stages prior to the quantizer.

The decimator must integrate the output of the quantizer to produce a multi-bit digital data stream at a lower clock rate. For example, a single-bit modulator may provide a digital pulse stream at 10 megahertz (MHz), but the ADC may decimate the digital output code by a factor of 128:1 to provide an output sample stream at approximately 80 kilohertz (kHz). A known rule of thumb in sigma-delta ADC design is for the integrator to have one more stage than the order of the modulator. For example, a three-stage integrator is desirable for a second-order modulator to attain good attenuation in the stopband.

Practical problems arise in implementing a sigma-delta ADC in integrated circuit form. In known integrated circuit ADCs the digital integrator, rather than the modulator, consumes the majority of circuit area. This relationship is caused by the way the digital integrator is implemented. Each integrator stage adds a digital input signal to a previous (delayed) sum to provide a current sum. To implement the addition function, known integrator stages include at a minimum a number of full adders equal to the bit length of the output of the particular stage, and may require more depending on the type of adder used. Each full adder requires many logic gates in order to implement the logic equations. By contrast, the delay function requires only one flip-flop per bit, and the modulator itself may be implemented with one DAC and only a small amount of analog circuitry. A reduction in the size of the digital integrator would thus have a large effect on the reduction of the overall size cost of the ADC.

SUMMARY OF THE INVENTION

Accordingly, there is provided, in one form, a digital integrator with reduced circuit area, comprising an adder portion, and first and second delay portions. The adder portion receives a digital input signal to be integrated once for each cycle of a clock at a first input and provides an output thereof in response to an addition of the digital input signal to second and third inputs thereof. The first delay portion is coupled to the adder portion, and delays the output of the adder portion for one cycle of the clock to provide a first delayed signal, and multiplies the first delayed signal by two to provide the third input of the adder portion. The second delay portion is coupled to the first delay portion and to the adder portion, and delays the first delayed signal for one cycle of the clock to provide a second delayed signal, and multiplies the second delayed signal by negative one to provide the second input of the adder portion.

In another form, there is provided an analog-to-digital converter comprising a sigma-delta modulator, and a digital integrator. The sigma-delta modulator has an input terminal for receiving an analog signal, and an output terminal for providing a first digital signal once for each cycle of a clock. The first digital signal has a density proportional to a sampled value of the analog signal. The digital integrator has an input terminal for receiving the first digital signal, and an output terminal for providing a second digital signal. The digital integrator comprises an adder portion, a first delay portion, and a second delay portion. The adder portion receives the first digital signal, and provides an output thereof in response to an addition of the first digital signal to second and third inputs thereof. The first delay portion is coupled to the adder portion, and delays the output of the adder portion for one cycle of the clock to provide a first delayed signal, and multiplies the first delayed signal by two to provide the third input of the adder portion. The second delay portion is coupled to the first delay portion and to the adder portion, and delays the first delayed signal for one cycle of said clock to provide a second delayed signal, and inverts the second delayed signal to provide the second input of said adder portion. The digital integrator provides the second digital signal in response to a predetermined one of the output of the adder portion, the first delayed signal, and the second delayed signal.

These and other features and advantages will be more clearly understood from the following detailed description taken in conjunction with the accompanying drawings.

DETAILED DESCRIPTION OF A PREFERRED EMBODIMENT

Figure 1:
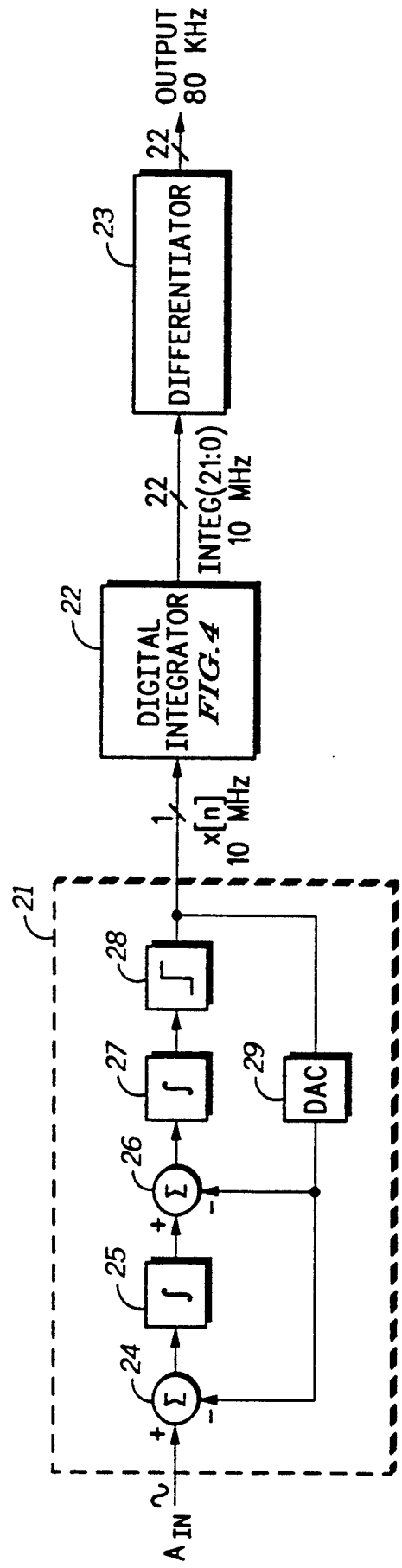
FIG. 1 illustrates in block diagram form a sigma-delta analog-to-digital converter (ADC) using an integrator in accordance with the present invention.

FIG. 1 illustrates in block diagram form a sigma-delta analog-to-digital converter (ADC) 20 using a digital integrator 22 in accordance with the present invention. ADC 20 also includes a sigma-delta modulator core 21 and a differentiator 23. Sigma-delta modulator core 21 has an input for receiving an analog input signal labelled "$A_{IN}$", and an output for providing a one-bit output labelled "x[n]" to an input of integrator 22. Sigma-delta modulator 21 is a conventional second-order sigma-delta modulator, which provides a single bit stream output having a density corresponding to the analog value of the input signal. Integrator 22 receives x[n] and provides a 22-bit digital output signal labelled "INTEG(21:0)" in response. Differentiator 23 receives INTEG(21:0) and provides an output labelled "OUTPUT" which represents the digital output code.

Sigma-delta modulator 21 includes a summing device 24, an integrator 25, a summing device 26, an integrator 27, a quantizer 28, and a digital-to-analog converter (DAC) 29. Summing device 24 has a positive input for receiving $A_{IN}$, a negative input, and an output. Integrator 25 has an input connected to the output of summing device 24, and an output. Summing device 26 has a positive input connected to the output of integrator 25, a negative input, and an output. Integrator 27 has an input connected to the output of summing device 26, and an output. Quantizer 28 has an input connected to the output of integrator 27, and an output for providing signal x[n]. In the illustrated embodiment, quantizer 28 is a one-bit quantizer, providing x[n] as a single-bit output stream. DAC 29 has an input connected to the output of quantizer 28 for receiving signal X[n], and an output connected to the negative input terminals of summing devices 24 and 26.

In general, it is preferred to make the number of integrator stages one greater than the order of the modulator; thus, integrator 22 is a three-stage integrator. Modulator 21 provides signal x[n] at 10 MHz, and integrator 22 integrates signal x[n] to provide signal INTEG(21:0) also at 10 MHz. Differentiator 23 implements a 128:1 decimation ratio to provide OUTPUT at approximately 80 kHz. However, other decimation ratios are also possible. Together, integrator 22 and differentiator 23 form a cascaded integrated comb (CIC) filter. Differentiator 23 samples INTEG(21:0) during successive 80 kHz clock periods, provides OUTPUT as the difference between the current and prior values of INTEG(21:0). Differentiator 23 has three stages and includes a register (not shown) for storing OUTPUT. In other embodiments, however, the last stage of integrator 22 itself could accumulate the integrated value and be reset at an 80 kHz rate, thus eliminating the first differentiator stage.

Figure 2:
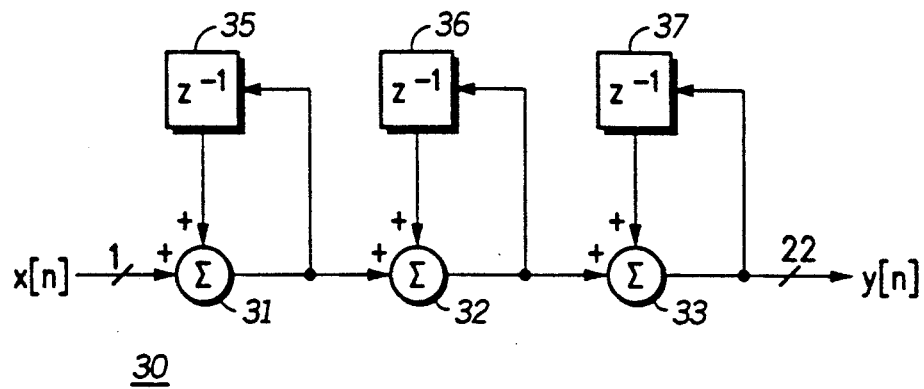
FIG. 2 illustrates in block diagram form a first three-stage integrator known in the prior art.

FIG. 2 illustrates in block diagram form a first three-stage integrator 30 known in the prior art. Integrator 30 includes summing devices 31–33, and delay elements 35–37. Summing device 31 has a first positive input for receiving signal x[n], a second positive input, and an output. Delay element 35 has an input connected to the output of summing device 31, and an output connected to the second positive input of summing device 31. Summing device 32 has a first positive input connected to the output of summing device 31, a second positive input, and an output. Delay element 36 has an input connected to the output of summing device 32, and an output connected to the second positive input of summing device 32. Summing device 33 has a first positive input connected to the output of summing device 32, a second positive input, and an output for providing signal y[n]. Delay element 37 has an input connected to the output of summing device 33, and an output connected to the second positive input of summing device 33.

Figure 3:
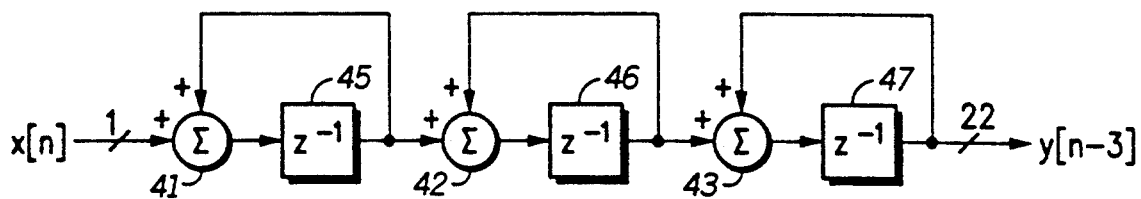
FIG. 3 illustrates in block diagram form a second three-stage integrator known in the prior art.

FIG. 3 illustrates in block diagram form a second three-stage integrator 40 known in the prior art. Integrator 40 includes summing devices 41–43, and delay elements 45–47. Summing device 41 has a first positive input for receiving x[n], a second positive input, and an output. Delay element 45 has an input connected to the output of summing device 41, and an output connected to the second positive input of summing device 41. Summing device 42 has a first positive input connected to the output of delay element 47, a second positive input, and an output. Delay element 46 has an input connected to the output of summing device 42, and an output connected to the second positive input of summing device 42. Summing device 43 has a first positive input connected to the output of delay element 46, a second positive input, and an output. Delay element 47 has an input connected to the output of summing device 43, and an output connected to the second positive input of summing device 43 and a signal y[n-3].

Referring to FIGS. 2 and 3 together, integrators 30 and 40 are each three-stage integrators suitable for use in ADC 20 of FIG. 1. The difference between the two is that the delay elements of integrator 30 appear only in the feedback path from the output of a summing device to the second positive input of the summing device. However, the delay elements of integrator 40 are connected serially in the path between the output of one summing device and the first positive input of a subsequent summing device. Thus, integrator 30 provides output signal y[n], whereas integrator 40 provides output signal y[n-3], which is three samples prior to signal x[n]. Since ADC 20 of FIG. 1 is used primarily in real-time applications such as audio, this sample delay is insignificant.

However, both integrator 30 and integrator 40 include three summing devices. While the delay elements may be implemented in a small amount of hardware using D flip-flops, the summing devices require full adders. In fact, the summing devices consume the majority of circuit area of integrators 30 and 40, as well as of an ADC using them. In order to reduce integrated circuit cost, it is desirable to minimize circuit area.

Figure 4:
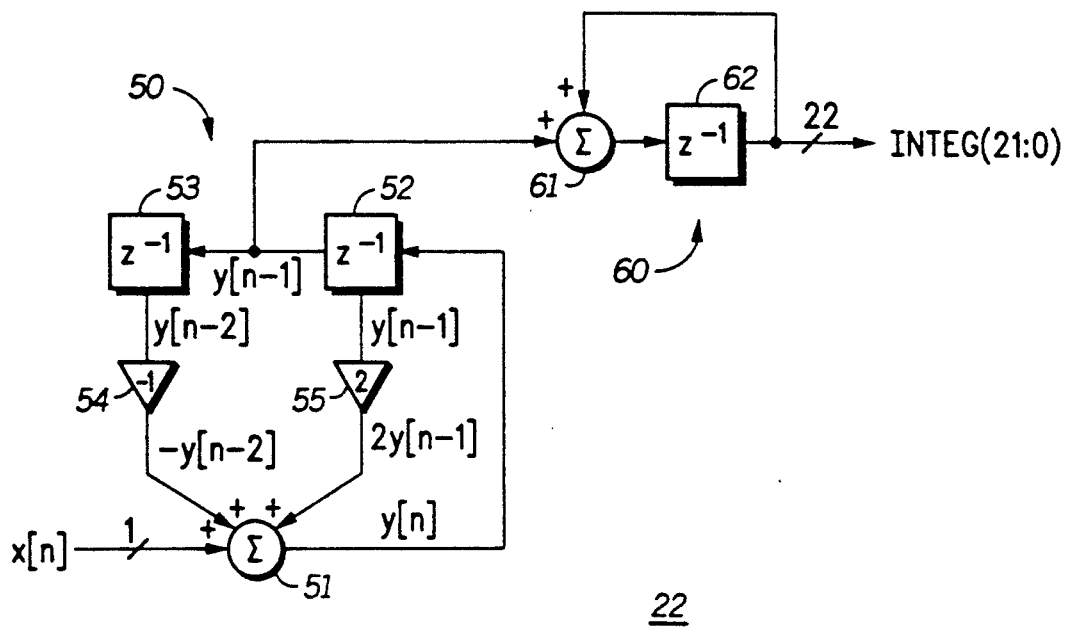
FIG. 4 illustrates in block diagram form the three-stage integrator of FIG. 1.

FIG. 4 illustrates in block diagram form digital integrator 22 of FIG. 1. Integrator 22 includes generally a two-stage integrator portion 50, and a one-stage integrator portion 60. Two-stage integrator portion 50 includes a summing device 51, delay elements 52 and 53, and multipliers 54 and 55. Summing device 51 has a first positive input for receiving signal x[n], a second positive input, a third positive input, and an output for providing signal y[n]. Delay element 52 has an input connected to the output of summing device 51, and an output for providing a signal labelled "y[n-1]". Delay element 53 has an input connected to the output of delay element 52, and an output for providing a signal labelled "y[n-2]". Multiplier 54 has an input terminal connected to the output of delay element 53, and an output terminal connected to the second positive input of summing device 51. Multiplier 55 has an input connected to the output of delay element 52, and an output connected to the third positive input of summing device 51. In one-stage integrator portion 60, summing device 61 has a first positive input connected to the output of delay element 52, a second positive input, and an output. Delay element 62 has an input connected to the output of summing device 61, and an output connected to the second positive input of summing device 61 for providing signal INTEG(21:0).

Integrator 22 differs from integrators 30 and 40 of FIGS. 3 and 4, respectively, in that the first two integration stages are accomplished with a single summing device 51 in two-stage integrator portion 50. Since summing devices are conventionally implemented with full adder cells, which are the most area-intensive circuitry, integrator 22 reduces the overall area of ADC 20 significantly.

To see how two-stage adder portion 50 implements the first two integration stages, consider the transfer function H(z) of a two-stage integration:

$$H(z) = (1/(-b \; 1-z^{-1}))^2 \qquad (1)$$

where z represents the sampling variable, and $z^{-1}$ represents a delay function. This transfer function can be expanded to $$H(z) = 1/(1 - 2z^{-1} + z^{-2}) \qquad (2)$$

Applying an inverse z-transform yields:

$$y[n] = x[n] + 2y[n-1] - y[n-2] \qquad (3)$$

which is precisely the output of summing device 51.

Note that any predetermined one of the output of summing device 51, the output of delay element 52, and the output of delay element 53 could be provided the first input terminal of summing device 61. The only difference is that INTEG(21:0) would be variously shifted in time by different numbers of clock periods. In most audio applications, this time shift is inconsequential. In the illustrated embodiment, two-stage integrator portion 50 provides the output of delay element 52 to one-stage integrator portion 60 for ease of implementation, as will be illustrated more particularly in FIG. 6 below.

Figure 5:
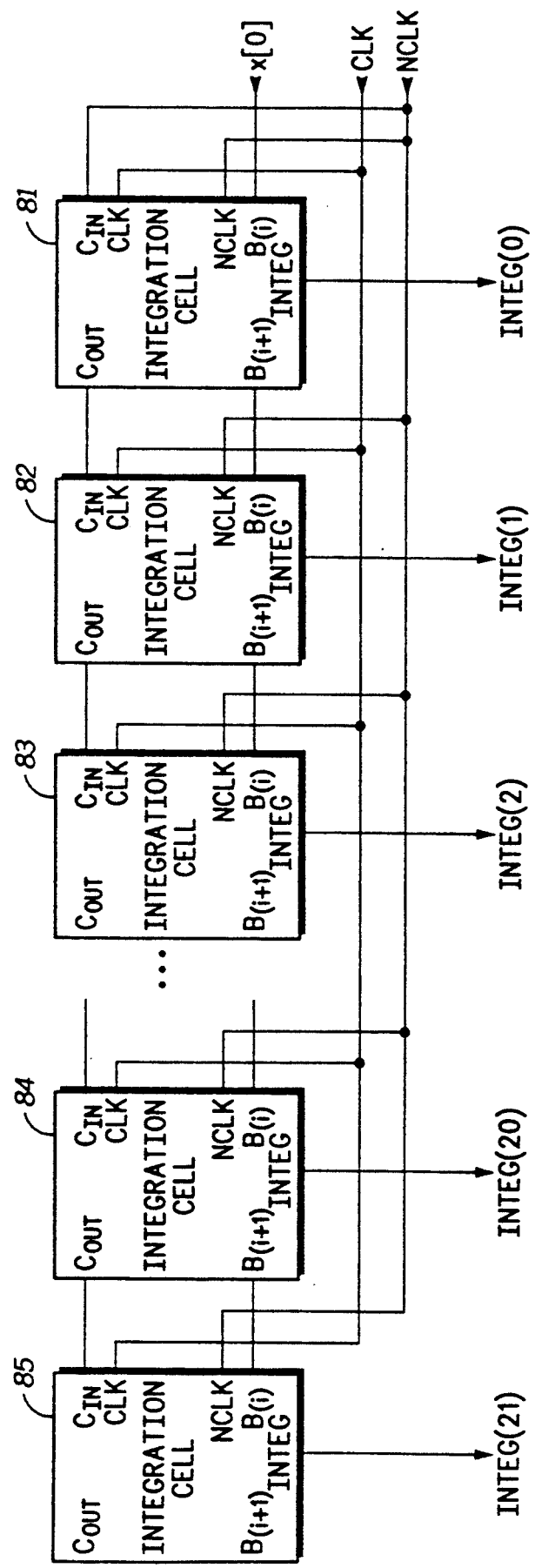
FIG. 5 illustrates in block diagram form one embodiment of the three-stage integrator of FIG. 4.

FIG. 5 illustrates in block diagram form one embodiment 80 of the three-stage integrator of FIG. 4. In the illustrated embodiment, integrator 80 includes twenty-two integration cells of which representative integration cells 81–85 are illustrated in FIG. 5. The integration cells are ordered from a least significant integration cell 81, to a most significant integration cell 85. Each integration cell has four inputs labelled "$B_{(i)}$", "$C_{IN}$", "CLK", and "NCLK", and three outputs labelled "$B_{(i+1)}$", "$C_{OUT}$", and "INTEG(i)", where i represents the bit position of the respective integration cell. Integration cell 81 has a B(i) input for receiving signal x[n], a $C_{IN}$ input for receiving a clock signal labelled "NCLK", a CLK input for receiving signal CLK, and an NCLK input for receiving signal NCLK. Signal NCLK is a clock signal which is the complement of clock signal CLK. The CLK and NCLK inputs of integration cells 81–85 have the same name as corresponding clock signals CLK and NCLK which they receive; however, the $C_{IN}$ input of integration cell 81 also receives signal NCLK and in this case the signal name should be clearly distinguished from the input terminal. The CLK and NCLK inputs of each integration cell receive signals CLK and NCLK, respectively. The $C_{IN}$ input of integration cell 82 is connected to the $C_{OUT}$ output of integration cell 81. In general, except for least-significant integration cell 81, the $C_{IN}$ input is connected to the $C_{OUT}$ output of a previous integration cell. The $B_{(i)}$ input of integration cell 82 is connected to the $B_{(i+1)}$ output of integration cell 81. In general, except for least-significant integration cell 81, the $B_{(i)}$ input is connected to the $B_{(i+1)}$ output of a previous integration cell. The INTEG(i) output of each cell provides one bit of the integrated output; illustrated integration cells 81–85 provide output bits INTEG(0), INTEG(1), INTEG(2), INTEG(20), and INTEG(21), respectively.

Figure 6:
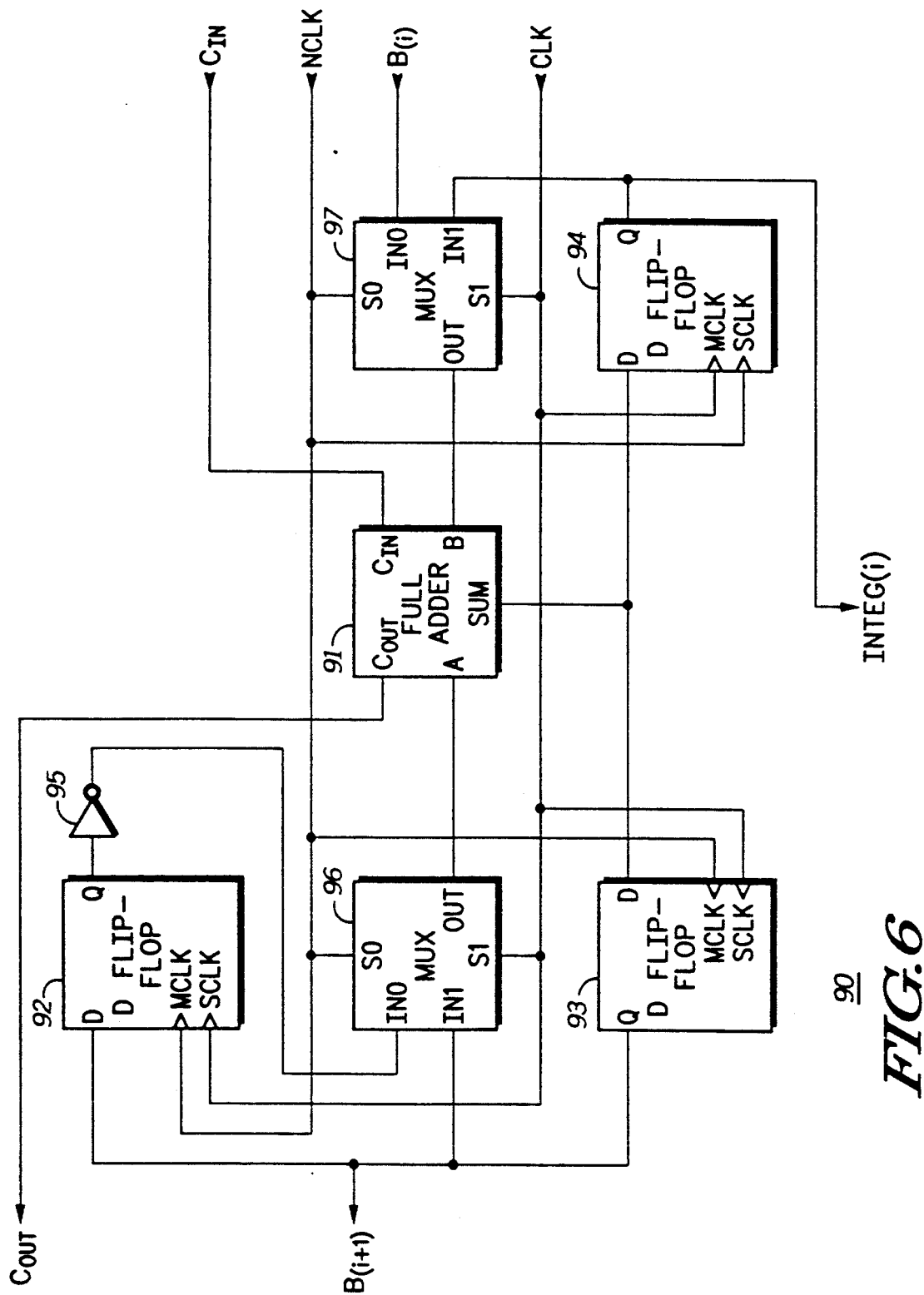
FIG. 6 illustrates in block diagram form an integration cell of FIG. 5.

The operation of each integration cell is more particularly described with reference to FIG. 6, which illustrates in block diagram form an integration cell 90 structurally identical to each of the twenty-two integration cells of FIG. 5. Integration cell 90 includes a full adder 91, D flip-flops 92–94, an inverter 95, and multiplexers (MUXes) 96 and 97. Full adder 91 has A and B operated inputs, a carry input labelled "$C_{IN}$" and providing the $C_{IN}$ input terminal of integration cell 90, a carry output labelled "$C_{OUT}$" providing the $C_{OUT}$ output terminal of integration cell 90, and a sum output labelled "SUM". Full adder 91 is a conventional full adder implemented in complementary metal oxide semiconductor (CMOS) transistor technology. Each D flip-flop has a delay input labelled "D", a master clock input labelled "MCLK", a slave clock input labelled "SCLK", and an output labelled "Q". Flip-flop 92 has a D input connected to the B(i+I) terminal, an MCLK input connected to the NCLK input terminal, an SCLK input connected to the CLK terminal, and a Q output terminal. Flip-flop 93 has a D input connected to the SUM output terminal of full adder 91, an MCLK input connected to the NCLK input terminal, an SCLK input connected to the CLK terminal, and a Q output terminal connected to the $B_{(i+1)}$ output terminal and the D input terminal of flip-flop 92. Flip-flop 94 has a D input connected to the SUM output terminal of full adder 91, an MCLK input connected to the CLK input terminal, an SCLK input connected to the NCLK terminal, and a Q output terminal connected to the INTEG(i) terminal. Inverter 95 has an input terminal connected to the Q output terminal of flip-flop 92, and an output terminal. MUX 96 has a first input terminal labelled "IN0" connected to the output terminal of inverter 95, a second input terminal labelled "IN1" connected to the $B_{(i+1)}$ terminal, a first input select control signal labelled "S0" connected to the NCLK terminal, a second input select control signal labelled "S1" connected to the CLK terminal, and an output terminal labelled "OUT" connected to the A input terminal of full adder 91. MUX 97 has an IN0 terminal connected to the B(0) terminal, an IN1 terminal connected to the Q output terminal of flip-flop 94, an S0 terminal connected to the NCLK terminal, an S1 terminal connected to the CLK terminal, and an OUT terminal connected to the B input terminal of full adder 91.

The functional block diagram of integrator 22 of FIG. 4 eliminates one set of twenty-two adders, leaving only adders 51 and 61. The actual implementation of digital integrator 80 eliminates the need for the second adder and performs the functions of adders 51 and 61 in a single two's complement ripple carry adder formed by full adder 91 of each integration cell. Integrator 80 time-multiplexes the first two integration stages, and the third integration stage, so that the full three-stage integration is implemented in just one set of twenty-two adders. This function is more clearly described in reference to clock signals CLK and NCLK.

Integration cell 90 implements the first two integration stages during a first period, in which CLK is inactive at a logic low and NCLK is active at a logic high. This period is referred to as an "ADD1" cycle. During the ADD1 cycle, flip-flop 93 functions as delay element 52 of FIG. 4 to provide the y[n−1]signal at the Q output thereof. The y[n−1]signal is conducted on the $B_{(i+1)}$ output of integration cell 90 to the $B_{(i)}$ input of the subsequent integration cell. The effect is that y[n−1]is left-shifted, implementing the multiply-by two function of multiplier 55 of FIG. 4. Also, the $B_{(i)}$ input of integration cell 90 is received as the $B_{(i+1)}$ output of a previous integration cell. Since least-significant integration cell 81 does not have an adjacent cell from which to receive a $B_{(i+1)}$ output, the $B_{(i)}$ input thereof may be used to receive x[n]. Flip-flop 92 functions as delay element 53, and inverter 95 performs the function of multiplier 54 of FIG. 4. Thus, the output of inverter 95 is equal to-y[n−2]. MUXes 96 and 97 pass the first inputs thereof to their respective outputs. Thus, full adder 91 receives-y[n−2]at the A input thereof, and 2y[n−1]at the B input thereof (except that integration cell 81 receives x[n]). To implement the carry chain, the $C_{OUT}$ output of an integration cell is provided to the $C_{IN}$ input of a subsequent integration cell; however the $C_{IN}$ input of integration cell 81 is strobed with a logic high level on NCLK, which thus adds one to the final result and therefore establishes the two's complement negative value for y[n−2].

Integration cell 90 implements the third integration stage during a second period, in which CLK is active at a logic high and NCLK is inactive at a logic low. This period is referred to as an "ADD2" cycle. During the ADD2 cycle, flip-flop 93 still functions as delay element 52 of FIG. 4 to provide the y[n−1]signal at the Q output thereof. However, MUX 96 selects the second input thereof to provide the y[n−1]signal to the A input of full adder 91. Flip-flop 94 functions as delay element 62, the Q output of which provides signal INTEG(i), which is fed back through the second input of MUX 97 to the B input of full adder 91.

By implementing three integration stages with a single group of twenty-two full adders, integrator 22 significantly reduces circuit area over conventional digital integrators. By reducing circuitry, integrator 22 also reduces power consumption. Furthermore, an integrator formed with integration cells like integration cell 90 is modular, and thus can be expanded to an arbitrary size. For example, it may be desirable to design an ADC with a different decimation ratio, and hence a different number of integration cells.

Integrator 22 is useful for a sigma-delta modulator having a two-level quantizer (i.e., a single-bit output). By using integration cells like integration cell 90, it is also possible to construct an integrator which receives the output of a three-level quantizer. In that case the $C_{IN}$ input can be used along with the $B_{(i)}$ input of integration cell 81 to represent one of three levels. A first or "0" level occurs when ($C_{IN}$=0) and (x[n]=0); a second or "1" level occurs when ($C_{IN}$=1) and (x[n]=0) or when ($C_{IN}$=0) and (x[n]=1); and a third or "2" level occurs when ($C_{IN}$=1) and (x[n]=1). Because two conditions represent a "1" level, it is not possible for the integrator to be easily expanded to accommodate a four-level quantizer.

While the invention has been described in the context of a preferred embodiment, it will be apparent to those skilled in the art that the present invention may be modified in numerous ways and may assume many embodiments other than that specifically set out and described above. For example, a two-stage digital integrator using two-stage integrator portion 50 of FIG. 4 may be connected to the output of a single-bit sigma-delta modulator. Also, a digital integrator according to the present invention may be used for other signal processing functions besides analog-to-digital conversion. Further, any two integration stages or combinations of integration stages can be time multiplexed in a single adder, rather than just the first two along with the third, as illustrated herein. Also, the full adder cells form a ripple carry type adder, but other adders such as carry lookahead, carry select, carry skip, etc. may be used. Accordingly, it is intended by the appended claims to cover all modifications of the invention which fall within the true spirit and scope of the invention.

I claim:

1. A digital integrator with reduced circuit area, comprising:
   adder means for receiving a digital input signal to be integrated once for each cycle of a clock at a first input, and for providing an output thereof in response to an addition of said digital input signal to second and third inputs thereof;
   first delay means coupled to said adder means, for delaying said output of said adder means for one cycle of said clock to provide a first delayed signal, and for multiplying said first delayed signal by two to provide said third input of said adder means; and
   second delay means coupled to said first delay means and to said adder means, for delaying said first delayed signal for one cycle of said clock to provide a second delayed signal, and for multiplying said second delayed signal by negative one to provide said second input of said adder means.

2. The digital integrator of claim 1, wherein said adder means comprises a predetermined number of full adders.

3. The digital integrator of claim 1, wherein said first delay means comprises:
   a first delay element having a first terminal coupled to said output of said adder means, and an output terminal for providing said first delayed signal; and
   a multiplier having an input terminal coupled to said output terminal of said first delay element, and an output terminal coupled to said third input terminal of said adder means.

4. The digital integrator of claim 1, wherein said second delay means comprises:
   a second delay element having a first terminal for receiving said first delayed signal, and an output terminal for providing said second delayed signal; and
   a second multiplier having an input terminal coupled to said output terminal of said second delay element, and an output terminal coupled to said second input terminal of said adder means.

5. The digital integrator of claim 1 further comprising an integration stage having an input for receiving said first delayed signal, and an output terminal for providing an output signal of the digital integrator.

6. The digital integrator of claim 5 wherein said integration stage comprises:
 second adder means for receiving said output signal of the digital integrator, and for providing an output thereof in response to an addition of said first delayed signal and a second input thereof; and
 third delay means for receiving said output of said second adder means, for delaying said output of said second adder means by one cycle of said clock to provide said output signal of the digital integrator, and for providing said output signal of the digital integrator to said second input of said second adder means.

7. The digital integrator of claim 6 wherein said second adder means is characterized as being time-multiplexed with said first adder means in a single adder circuit.

8. The digital integrator of claim 1 wherein said digital input signal is characterized as having three logic levels.

9. A digital integrator with reduced circuit area, comprising:
 an adder having a first input terminal for receiving an input bit stream to be integrated once for each cycle of a clock, a second input terminal, a third input terminal, and an output terminal for providing a first output signal of the digital integrator;
 a first delay element having an input terminal coupled to said output terminal of said adder, and an output terminal for providing a first delayed signal, said first delayed signal being a second output signal of the digital integrator;
 a first multiplier having an input terminal for receiving said first delayed signal, and an output terminal coupled to said third input terminal of said adder for providing a product equal to twice a number represented at said input terminal thereof;
 a second delay element having an input for receiving said first delayed signal, and an output for providing a second delayed signal, said second delayed signal being a third output signal of the digital integrator; and
 a second multiplier having an input terminal coupled to said output terminal of said second delay element, and an output terminal coupled to said second input terminal of said adder, for providing a product equal to negative one times a number represented at said input terminal thereof.

10. The digital integrator of claim 9 further comprising:
 a second adder having a first input terminal for receiving a predetermined one of said first, second, and third output signals of the digital integrator, a second input terminal, and an output terminal; and
 a third delay element having an input terminal coupled to said output terminal of said second adder, and an output terminal for providing a fourth output signal of the digital integrator.

11. The digital integrator of claim 10 wherein said second adder is time-multiplexed with said first adder in a single adder circuit.

12. A digital integrator with reduced circuit area, comprising:
 a predetermined number of integration cells corresponding to a bit length of an output of the digital integrator, and ordered from a least-significant integration cell to a most significant integration cell, each integration cell comprising:
  a full adder having first and second inputs, a carry input, a carry output, and a sum output;
  first delay means for delaying said sum output of said full adder to provide a first signal;
  second delay means coupled to said first delay means for delaying said first signal to provide a second signal;
  an inverter coupled to said second delay means for inverting said second signal to provide a third signal;
  first multiplexer means for providing one of said first signal and said third signal selected in response to first and second clock periods, respectively, to said first input of said full adder;
  third delay means for delaying said sum output of said full adder to provide a fourth signal, said fourth signal being a corresponding bit of the output of the digital integrator; and
  second multiplexer means for providing one of an input of said integration cell and said third signal selected in response to first and second clock periods, respectively, to said second input of said full adder;
  said second multiplexer means of said least significant integration cell selecting one of said data input stream and said fourth signal;
  said second multiplexer means of each integration cell besides said least significant integration cell selecting one of said first signal and said fourth signal;
  said carry input of said full adder of said least-significant integration cell receiving a predetermined binary value;
  said carry input of said full adder of each of said plurality of integration cells besides said leash significant integration cell coupled to said carry output of said full adder of a previous integration cell.

13. The digital integrator of claim 12 wherein said first, second, and third delay means each comprises a D flip-flop.

14. The digital integrator of claim 12 wherein said first and second delay means latch inputs thereof during said first period and provide outputs thereof during said second period, and wherein said third delay means latches an input thereof during said second period and provides an output thereof during said first period.

15. An analog-to-digital converter (ADC), comprising:
 a sigma-delta modulator having an input terminal for receiving an analog signal, and an output terminal for providing a first digital signal once for each cycle of a clock, said first digital signal having a density proportional to a sampled value of said analog signal; and
 a digital integrator having an input terminal for receiving said first digital signal, and an output terminal for providing a second digital signal, said digital integrator comprising:
  adder means for receiving said first digital signal, and for providing an output thereof in response to an addition of said first digital signal to second and third inputs thereof;
  first delay means coupled to said adder means, for delaying said output of said adder means for one cycle of said clock to provide a first delayed signal, and for multiplying said first delayed signal by two to provide said third input of said adder means; and second delay means coupled to said first delay means and to said adder means, for delaying said first delayed signal for one cycle of said clock to provide a second delayed signal, and for inverting said second delayed signal to provide said second input of said adder means;

said digital integrator providing said second digital signal in response to a predetermined one of said output of said adder means, said first delayed signal, and said second delayed signal.

16. The analog-to-digital converter (ADC) of claim 15, wherein said adder means comprises a predetermined number of full adders.

17. The analog-to-digital converter (ADC) of claim 15, wherein said first delay means comprises:
a first delay element having a first terminal coupled to said output of said adder means, and an output terminal for providing said first delayed signal; and
a multiplier having an input terminal coupled to said output terminal of said first delay element, and an output terminal coupled to said third input terminal of said adder means.

18. The analog-to-digital converter (ADC) of claim 15, wherein said second delay means comprises:
a second delay element having a first terminal for receiving said first delayed signal, and an output terminal for providing said second delayed signal; and
an inverter having an input terminal coupled to output terminal of said second delay element, and an output terminal coupled to said second input terminal of said adder means.

19. The analog-to-digital converter (ADC) of claim 15 further comprising an integration stage having an input for receiving said predetermined one of said output of said adder means, said first delayed signal, and said second delayed signal, and an output terminal for providing said second digital signal.

20. The analog-to-digital converter (ADC) of claim 19 wherein said integration stage comprises:
second adder means for receiving said output signal of the digital integrator, and for providing an output thereof in response to an addition of said first delayed signal and a second input thereof; and
third delay means for receiving said output of said second adder means, for delaying said output of said second adder means by one cycle of said clock to provide said second digital signal, and for providing said second digital signal to said second input of said second adder means.

21. The analog-to-digital converter (ADC) of claim 20 wherein said second adder means is characterized as being time-multiplexed with said first adder means in a single adder circuit.

22. The analog-to-digital converter (ADC) of claim 15 further comprising a differentiator having an input for receiving said second digital signal, and an output for providing an output of the analog-to-digital converter (ADC).

23. The analog-to-digital converter (ADC) of claim 15, wherein said sigma-delta modulator provides said first digital signal at one of three logic levels.

* * * * *